United States Patent [19]

Gladstone

[11] 4,019,067
[45] Apr. 19, 1977

[54] CONDUCTIVE PROBE LEVEL CONTROL
[75] Inventor: Roland Aaron Gladstone, Morton Grove, Ill.
[73] Assignee: International Telephone and Telegraph Corporation, New York, N.Y.
[22] Filed: Nov. 17, 1975
[21] Appl. No.: 632,380
[52] U.S. Cl. .............................. 307/118; 73/304 R; 137/392
[51] Int. Cl.² .......................................... G01F 23/00
[58] Field of Search ......... 307/118, 116; 73/304 R, 73/290 R, 308, 304 C; 137/392, 424, 386, 387; 340/244 R, 244 C; 317/DIG. 3

[56] References Cited
UNITED STATES PATENTS 3,922,564  11/1975  Kachuk et al. .................. 73/304 R Primary Examiner—Herman Hohauser
Attorney, Agent, or Firm—James B. Raden; William J. Michals

[57] ABSTRACT

A liquid level control system is disclosed. The system includes at least one level sensing electrode which is fixedly mounted to a vessel and projects therein. The probe is adapted to contact a fluid within the vessel to utilize the electrical conductivity of the fluid to complete a circuit when the fluid contacts the probe. The probe is coupled between a point of reference potential and the control electrode of a single silicon controlled rectifier (SCR). The main electrodes of the SCR are serially coupled with the coil of a low-voltage A.C. relay and the secondary winding of a step-down transformer. Accordingly, the use of a relatively low secondary voltage avoids shock hazards; and, the sensitivity of the system is increased by the effective gain provided by the SCR. The use of an A.C. current in the probe avoids the galvanic corrosion which otherwise follows from D.C. current operation.

5 Claims, 3 Drawing Figures

CONDUCTIVE PROBE LEVEL CONTROL

BACKGROUND OF THE INVENTION

This invention relates to level control devices for liquids and other conductive materials and, more particularly, to such devices utilizing electronic circuitry in the probe circuit.

Liquid level control systems, such as low-water cut-off systems, are known in the art as exemplified in U.S. Pat. No. 3,834,357. These systems monitor the fluid level in vessels such as hot water boilers, or the like, by utilizing the conductivity of the fluid within the vessel. That is, an insulated probe projects internally of the vessel such that an electrical path is completed from the conductive portion of the probe through the liquid and to the grounded walls of the vessel, when the fluid is in contact with the probe. This circuit, in turn, completes a series circuit comprising the secondary winding of an isolation transformer and a relay having at least one set of contacts for controlling an external circuit such as a low-water alarm. An isolation transformer is utilized in these systems for safety considerations. That is, the isolation transformer avoids the possibility of having an electrically "hot" housing or exposed surface of any of the associated apparatus. However, in order to maintain a desired minimum level of sensitivity to ensure reliable detection when using fluids having low electrical conductivity, the secondary winding voltage is typically the same as the primary winding, which may be, for example, 120 or 240 volts. Notwithstanding the isolation transformer, this relatively high secondary potential may pose a safety problem such as, for example, to a workman who inadvertently physically contacts the exposed conductor of the probe. Thus, in these prior art systems, system safety and system sensitivity are in competition with one another.

Low secondary voltage systems, including electronic systems, have been proposed. However, these systems utilize relatively sophisticated and expensive techniques such as, for example, D.C. amplifiers wherein the A.C. probe signal voltage is converted to D.C. for further processing by the electronic circuit, such as by means of A.C. to D.C. converter or bridges and the like. The A.C. to D.C. interface has been necessary because it is desirable to provide an A.C. voltage in the probe circuit so as to avoid contamination of the probe due to electrolysis as results from strictly D.C. operation. In any event, these prior art liquid level control systems have resorted to expensive and complex circuit design techniques to provide a usable system.

These and other disadvantages are overcome by the present invention wherein a liquid level control system is provided utilizing a relatively low voltage secondary potential, the advantages of A.C. operation, and simple and relatively inexpensive circuitry which also utilizes the A.C. voltage signal of the probe circuit.

SUMMARY OF THE INVENTION

Briefly, a liquid control system for use with a conductive probe of the type wherein the impedance of the probe is determined by the conductivity of a media in contact with the probe is provided. The system includes a circuit wherein a transformer having a primary winding for coupling to a primary source of alternating current is provided. A secondary winding of the transformer provides a source of alternating current operating potential which is substantially less than the potential of the primary source. The system includes a relay having a coil responsive to alternating current and at least one set of contacts for controlling an external circuit. Means are provided for coupling one end of the relay coil and the secondary winding of the transformer to a point of reference potential with respect to the operating potential. A controlled rectifier having first and second main electrodes and a control electrode is coupled between the other ends of the coil and secondary winding. Means are also provided for coupling the probe between the control electrode and the point of reference potential wherein the control rectifier becomes conductive when the impedance of the probe is less than a given level.

BRIEF DESCRIPTION OF THE DRAWING

The advantages of this invention will become more readily appreciated as the same becomes better understood by reference to the following detailed description when taken in conjunction with the accompanying drawing wherein.

DETAILED DESCRIPTION

Figure 1:
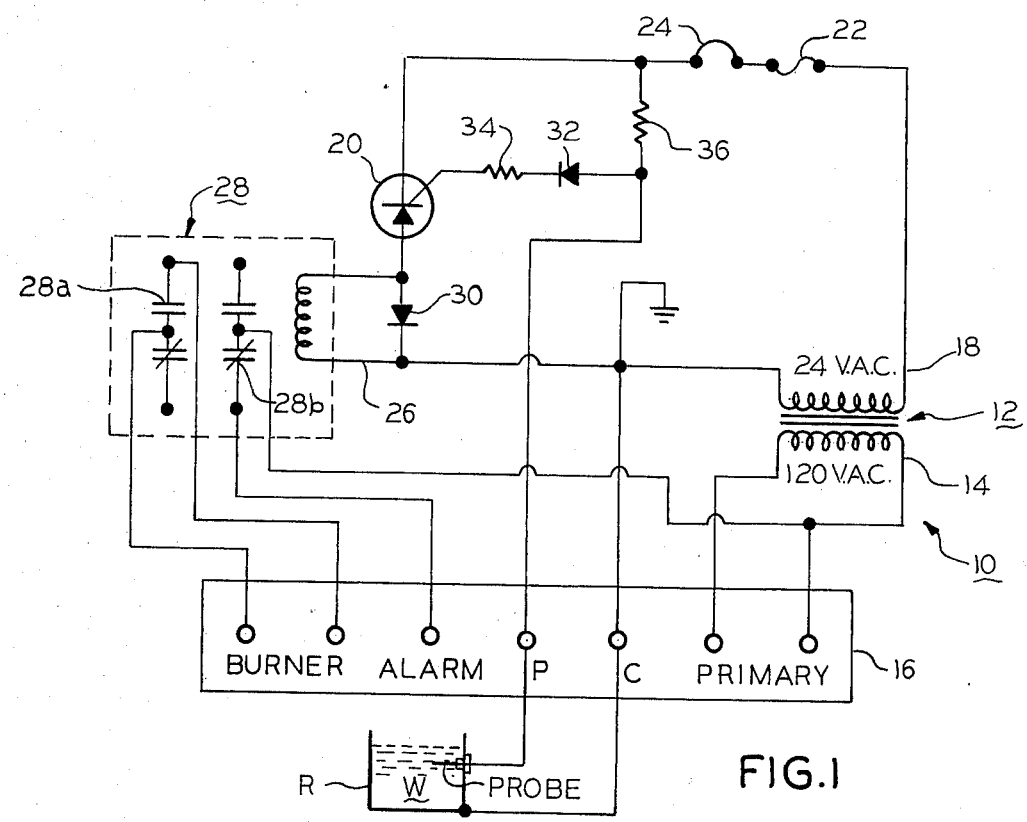
FIG. 1 is a combined schematic and functional diagram of a liquid control system, in accordance with the present invention, as applied to a hot water boiler.

Referring now to FIG. 1, there is shown generally at 10 a liquid level control system adapted to provide a low-level cut-off and alarm function. System 10 includes an isolation transformer 12 having a primary winding adapted for coupling to a primary source of electrical power such as 120 VAC, as by way of a terminal block 16. A secondary winding 16 of transformer 12 provides a stepped-down voltage such as, for example, 24 VAC. One end of secondary winding 16 is coupled to a point of reference potential such as ground. The other end of winding 16 is coupled to the cathode electrode of a silicon controlled rectifier (SCR) 20 by way of a fuse 22 and a jumper wire 24. The function of jumper wire 24 will be fully discussed with reference to the description of the apparatus of FIG. 2. The anode electrode of SCR 20 is connected to the junction of one end of coil 26 of relay 28, and to the anode of a diode 30. The other end of coil 26 and the cathode of diode 30 are connected to ground. The probe input p is coupled to the gate or control electrode of SCR 20 by way of diode 32 and current-limiting resistor 34. The probe input P is also coupled to the ungrounded end of secondary winding 18 by way of a sensitivity resistor 36.

Relay 28 further includes a pair of form "C" contacts which, as illustrated in FIG. 1, are strapped to provide a set of normally open contacts 28a and a set of normally closed contacts 28b. The normally open contacts 28a are connected to terminal block 16 to provide a burner control function. The normally closed contacts 28b are coupled to terminal block 16 to control an external alarm circuit (not shown). FIG. 1 further illustrates a vessel or reservoir R having a liquid such as water W disposed therein. An insulated probe is mounted to a suitable surface of reservoir R such that its conductive portion projects within reservoir R but is insulated from the wall thereof. System 10 interfaces with reservoir R, with the instrumentation thereon, by way of terminals P and C of terminal block 16.

The operation of system 10 of FIG. 1 is described as follows. The primary power is applied to the respective terminals of terminal block 16 as are the circuit leads of the burner and alarm circuits. When the level of the liquid W is above the position of the probe, a conductive path is established between the conductive portion of the probe and the walls of the reservoir R. On each of the positive or first half-cycles of the alternating current output of transformer 12, conventional current flows from the transformer through fuse 22 and jumper wire 24 toward the cathode of SCR 20. During these first half-cycles, the SCR 20 is back-biased and it is therefore in its non-conducting mode. However, on the negative or second half-cycles, conventional current flows through the coil 26 of relay 28 toward the anode of SCR 20. Simultaneously, if the liquid level W exceeds the level of the probe, conventional current flows from ground through liquid W and toward the junction of the anode of diode 32 and resistor 36. This current forward biases diode 32 and develops a voltage across resistor 36 which is positive relative to the voltage at the cathode of SCR 20. Accordingly, SCR becomes biased into its conductive mode which, accordingly, activates relay 28. Once activated, the normally open contacts 28a close and the normally closed contacts 28b open. As long as the conductive path between the probe and the wall of reservoir R is maintained, relay 28 will be maintained in its activated state even though it is only being powered on half-cycles of the transformer secondary output. If however, the liquid level thereafter drops below the level of the probe, current no longer flows toward the anode of diode 32 and, accordingly, the forward bias at the control electrode of SCR 20 is removed. Therefore, on the following half-cycle, SCR commutates and, accordingly, returns to its non-conductive state. At this point, contacts 28a resume their normally open condition and contacts 28b resume their normally closed condition. Accordingly, the burner circuit is then deactivated and the alarm circuit is activated to provide a low-level alarm.

The function of resistor 34 is to provide current limiting in the control electrode circuit. The value of resistor 36 is selected to provide circuit stability on the one hand and the desired degree of sensitivity on the other. For example, in one constructed embodiment, the value of resistor 36 was selected as 2.2 K ohms which provided satisfactory operation for liquid conductivities in excess of 50 K ohms equivalent resistance. Further, by increasing the value of resistor 36, the range of corresponding conductivity levels should correspondingly increase.

Figure 3:
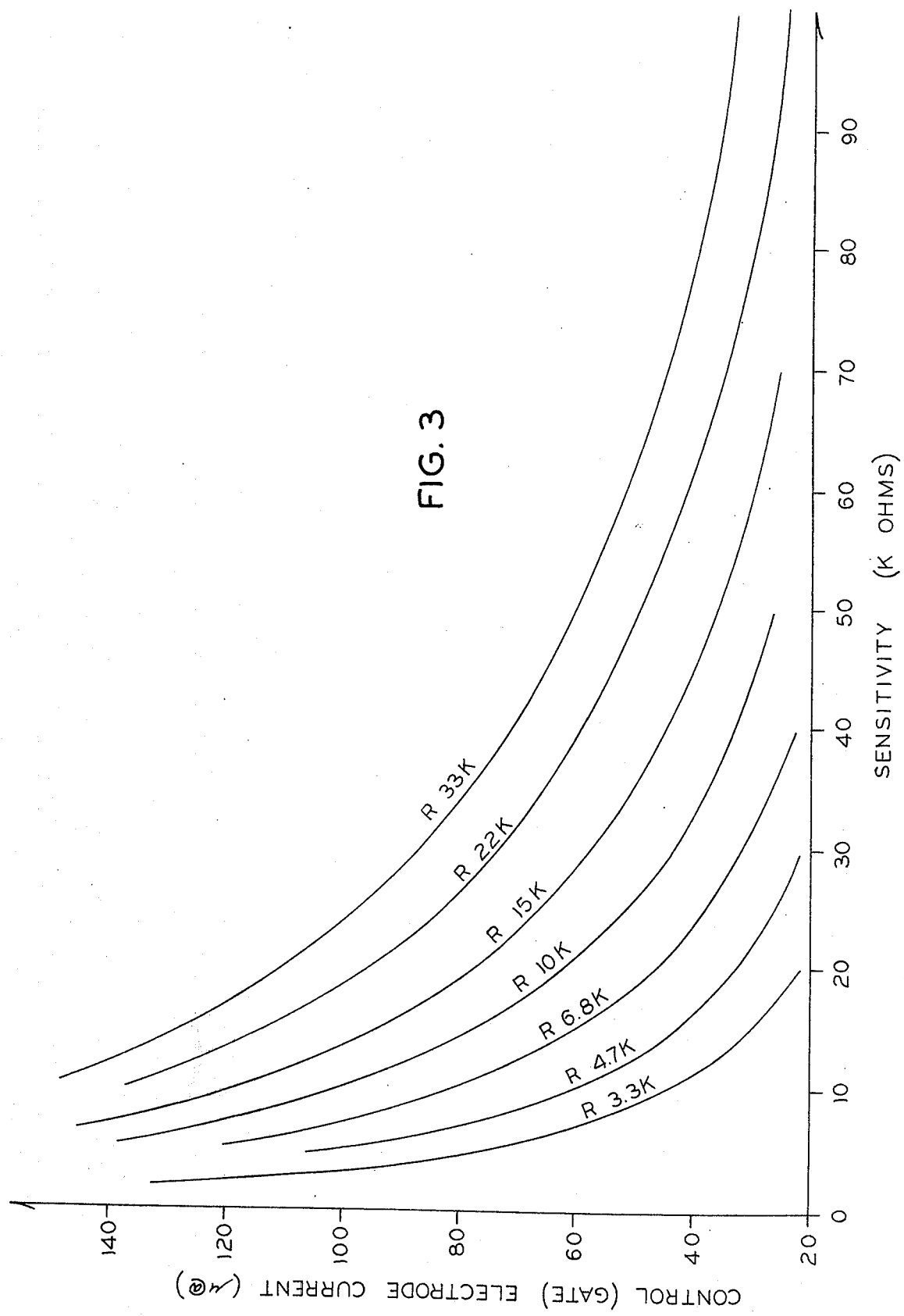

FIG. 3 is a graph illustrating a family of curves which were taken in another constructed embodiment using an SCR with somewhat less effective gain, and in which the value of resistor 36 was varied from 3.3 K to 33 K ohms. The value of resistor 34 was fixed at 47 K ohms. The various values of measured control electrode current are plotted along the ordinate of FIG. 3 in microamperes; and the resulting sensitivities, in terms of equivalent resistance, are plotted along the abscissa. It can be seen that by increasing the value of sensitivity resistor 36, the overall sensitivity of system 10, in accordance with the present invention, can be correspondingly increased to meet a given system requirement.

The function of diode 30 across relay coil 26 is twofold. First, diode 30 functions to dissipate the back emf which is generated across coil 26 when relay 28 is deactivated. Secondly, diode 30 provides, in accordance with a feature of the present invention, an important safety function. That is, should SCR 20 fail and become permanently conductive regardless of the liquid level, diode 30 "loads down" the circuit sufficiently to ensure that fuse 22 melts or "blows". If diode 30 were not present, and SCR 20 fails in its conductive mode, the resulting current flow through relay coil 26 would be insufficient to melt fuse 22. That is, the value of fuse 22 is normally selected to provide protection against current levels greatly in excess of that which flows through coil 26 under normal conditions. Hence, if the failure were solely confined to SCR 20 being in its conductive mode, normal current levels would nevertheless flow through relay coil 26 and the associated circuit. Conversely, during normal operation when SCR 20 becomes conductive by virtue of the liquid level exceeding the level of the probe, and since diode 30 and SCR are disposed in a back-to-back or "bucking" relationship, essentially no current flows through diode 30 and the circuit current levels are well below the melt level of fuse 22.

It should now be appreciated that the additional safety feature provided by diode 30 eliminates the situation where, due to failure of SCR 20, system 10 fails to provide its intended function becuase relay 28 remains activated even though the liquid level may be dangerously low.

Figure 2:
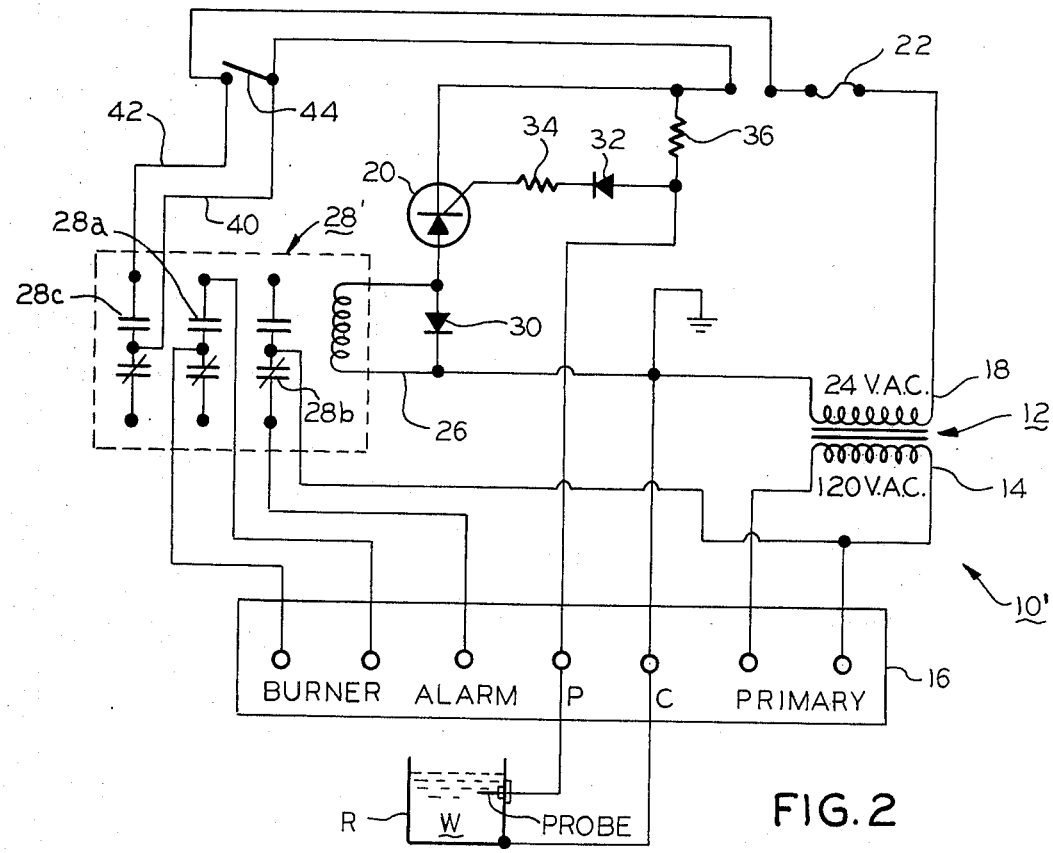
FIG. 2 is an alternate embodiment of the present invention further illustrating a manual reset feature; and, FIG. 3 is a graph illustrating a family of curves corresponding to a plurality of system sensitivities which result when one parameter of the system, in accordance with the present invention, is varied to meet different applications.

Referring now to FIG. 2, there is shown an alternate embodiment of the present invention. FIG. 2 is similar to FIG. 1 and accordingly like elements bear like reference numerals. In FIG. 2, jumper wire 24 is removed and relay 28' is provided with an additional set of normally open contacts 28c. Contacts 28c are coupled across the jumper wire terminals as by way of leads 40 and 42. A normally open manual reset switch 44 is coupled across contacts 28c in any suitable manner. System 10' of FIG. 2 has the advantage that once relay 28' becomes deactivated — due to a low-level detection which causes SCR 20 to become non-conductive — the system cannot be reactivated and the alarm remains activated until the system is manually reset by an operator. That is, once relay 28' is deactivated, due to the alarm condition, the secondary circuit of transformer 12 is opened and remains so until switch 44 is depressed. Hence, the fault condition (such as low-water) must not only be corrected, but the operator must be physically present to turn off the alarm. This has the advantage of ensuring that the operator does make an inspection even if only in intermittent low-level condition was experienced.

It will be appreciated by those skilled in the art that level control system 10, in accordance with the present invention, is not limited to use as a low-level cut-off and alarm device as illustrated in FIGS. 1 and 2. For example, system 10 may also be used for differential level control wherein two or more separate probes are utilized to provide both a high-level control function and a low-level control function and/or alarm. To illustrate, a high-level probe can be coupled to terminal P of terminal block 16 in FIG. 1. A second probe may also be connected to terminal P by way of a set of contacts on relay 28. For example, in a differential level control, "pump-up" system, the second or lower probe would be connected to terminal P by way of a set of normally open contacts of relay 28. A set of normally closed contacts would be used to control a pump circuit. Thus, if the high probe, which is directly connected to terminal P, were to detect a high-water condition, SCR 20 would be controlled to its conductive state whereupon relay 28 would be activated and the normally closed relay contacts which control the pump circuits would open and, therefore, shut off the pump. Simultaneously, the normally open contacts in the lower probe circuit would close thereby electrically interconnecting both probes in parallel. Thus, if the water level were to thereafter drop below the level of the higher probe, the pump would still remain off as the lower probe continues to bias SCR 20 into conduction. However, when the level drops below the lower probe, SCR commutates on the next positive half-cycle thereby deactivating the relay causing normally closed pump contacts to again activate the pump.

It should now be appreciated that the liquid level control system in accordance with the present invention provides a low-voltage A.C. probe circuit, and a simplified and inexpensive circuit which nevertheless utilizes the effective gain provided by a controlled rectifier. For example, as previously discussed, it has been found that the liquid level control system provided successful operation with liquid conductivity levels in excess of 50 K ohms, even though the probe voltage — which was current-limited to approximately 10 m@ by the sensitivity resistor — was limited to approximately 24 VAC. It will be appreciated by those skilled in the art that the prior art liquid level control systems utilizing high voltage secondary operating potential are limited to conductivity ranges on the order of 5 to 10 K ohms.

What has been taught then is a liquid level control system facilitating, notably, low-voltage A.C. probe circuit potential with the use of a simplified but highly reliable control circuit. The form of the invention illustrated and described herein is but a preferred embodiment of these teachings in the form currently preferred for manufacture. It is shown as an illustration of the inventive concepts, however, rather than by way of limitation, and it is pointed out that various modifications and alternations may be indulged in within the scope of the appended claims.

I claim:

1. A fusable control system for use with a conductive probe level control device said probe having first and second electrically separated portions wherein the impedance of said probe is determined by the conductivity of a media in contact with said probe between said first and second portions, said system comprising, in combination:

a transformer having a primary winding for coupling to a primary source of alternating current and a secondary winding for providing a source of alternating current operating potential, and wherein said operating potential is substantially less than the potential of said primary source;

a fuse serially coupled with one of said windings and being operative to interrupt said source of operating potential when the current in said one of said windings exceeds a predetermined level;

a relay having a coil and being responsive to alternating current to activate said relay, said relay having at least one set of contacts for controlling an external circuit;

means for coupling one end of said relay coil and said secondary winding to a point of reference potential with respect to said operating potential;

a unidirectional controlled rectifier having first and second main electrodes coupled between the other ends of said relay coil and said secondary winding, and said controlled rectifier having a control electrode for varying the impedance of said controlled rectifier between relatively conducting and non-conducting states;

a diode coupled in parallel with said coil of said relay and poled in back-to-back relationship to said controlled rectifier; and, means for coupling said probe between said control electrode and said point of reference potential wherein said controlled rectifier becomes conductive when the impedance of said probe is less than a given level and a rectified, unidirectional altenating current is applied to said relay coil, whereby said diode is normally non-conductive and wherein said diode becomes conductive if said controlled rectifier becomes conductive in the opposite direction thereof whereby said current in said one of said windings exceeds said predetermined level.

2. The system according to claim 1, including a resistor connected between one of said main electrodes of said controlled rectifier and said control electrode of said controlled rectifier.

3. The system according to claim 1, wherein said relay includes a second set of contacts which are normally open and closed when said relay is activated; and wherein said second set of contacts are serially coupled between said relay coil and said secondary winding; and, further including a normally open manual operated switch coupled across said second set of contacts.

4. The system according to claim 1, wherein said controlled rectifier is a silicon controlled rectifier.

5. The system according to claim 4, including a resistor and a diode serially connected between said other and of said secondary winding and the control electrode of said silicon controlled rectifier.

* * * * *